(12) United States Patent
Anklin-Imhof et al.

(10) Patent No.: US 7,350,421 B2
(45) Date of Patent: Apr. 1, 2008

(54) VIBRATORY MEASUREMENT TRANSDUCER

(75) Inventors: Martin Anklin-Imhof, Dornach (CH); Christian Schuetze, Basel (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/299,785

(22) Filed: Dec. 13, 2005

(65) Prior Publication Data
US 2006/0150750 A1 Jul. 13, 2006

Related U.S. Application Data

(60) Provisional application No. 60/635,011, filed on Dec. 13, 2004.

(30) Foreign Application Priority Data
Dec. 13, 2004 (DE) ...................... 10 2004 060 115

(51) Int. Cl.
*G01F 1/84* (2006.01)
(52) U.S. Cl. ................................. 73/861.355
(58) Field of Classification Search ................................ 73/861.355–861.357
See application file for complete search history.

(56) References Cited

U.S. PATENT DOCUMENTS

| 5,054,326 | A | * | 10/1991 | Mattar | .................. 73/861.355 |
| 5,926,096 | A | | 7/1999 | Mattar | |
| 6,415,668 | B1 | | 7/2002 | Cage | |
| 6,450,042 | B1 | | 9/2002 | Lanham | |
| 6,662,120 | B2 | * | 12/2003 | Drahm et al. | .................. 702/43 |
| 6,802,224 | B2 | | 10/2004 | Nakao | |
| 2004/0031328 | A1 | | 2/2004 | Henry | |
| 2004/0045371 | A1 | | 3/2004 | Cage | |

FOREIGN PATENT DOCUMENTS

EP 1 154 243 A1 11/2001
EP 1 248 084 A 10/2002

* cited by examiner

*Primary Examiner*—Harshad Patel
(74) *Attorney, Agent, or Firm*—Bacon & Thomas, PLLC

(57) ABSTRACT

The measurement transducer includes a transducer housing, which exhibits a plurality of natural oscillation modes, as well as at least one first flow tube held oscillatably in the transducer housing, vibrating at least at times, and conveying at least a portion of the medium to be measured. Additionally, the measurement transducer includes an electromechanical, especially electrodynamic, exciter arrangement acting on the at least one flow tube for producing and/or maintaining mechanical oscillations of the at least one flow tube, and a sensor arrangement reacting to movements of the flow tube, especially bending oscillations, for producing at least one oscillation measurement signal representing oscillations of the flow tube. Additionally, for improving the oscillation properties and, consequently, also the measurement accuracy of the measurement transducer, at least three coupling elements are provided for connecting the first and second flow tubes together at the inlet end, as well as at least three coupling elements for connecting the first and second flow tubes together at the outlet end. By using at least six coupling elements, it is possible to produce vibration-type measurement transducers of high measuring accuracy even at large nominal diameters of more than 150 mm, especially also while largely maintaining already established and proven forms of construction.

41 Claims, 5 Drawing Sheets

(PRIOR ART)    (PRIOR ART)

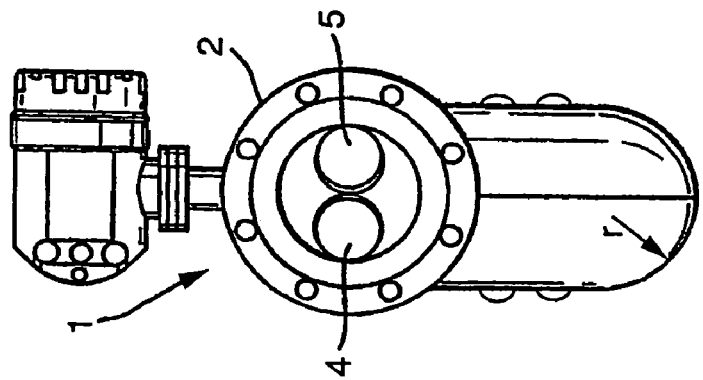
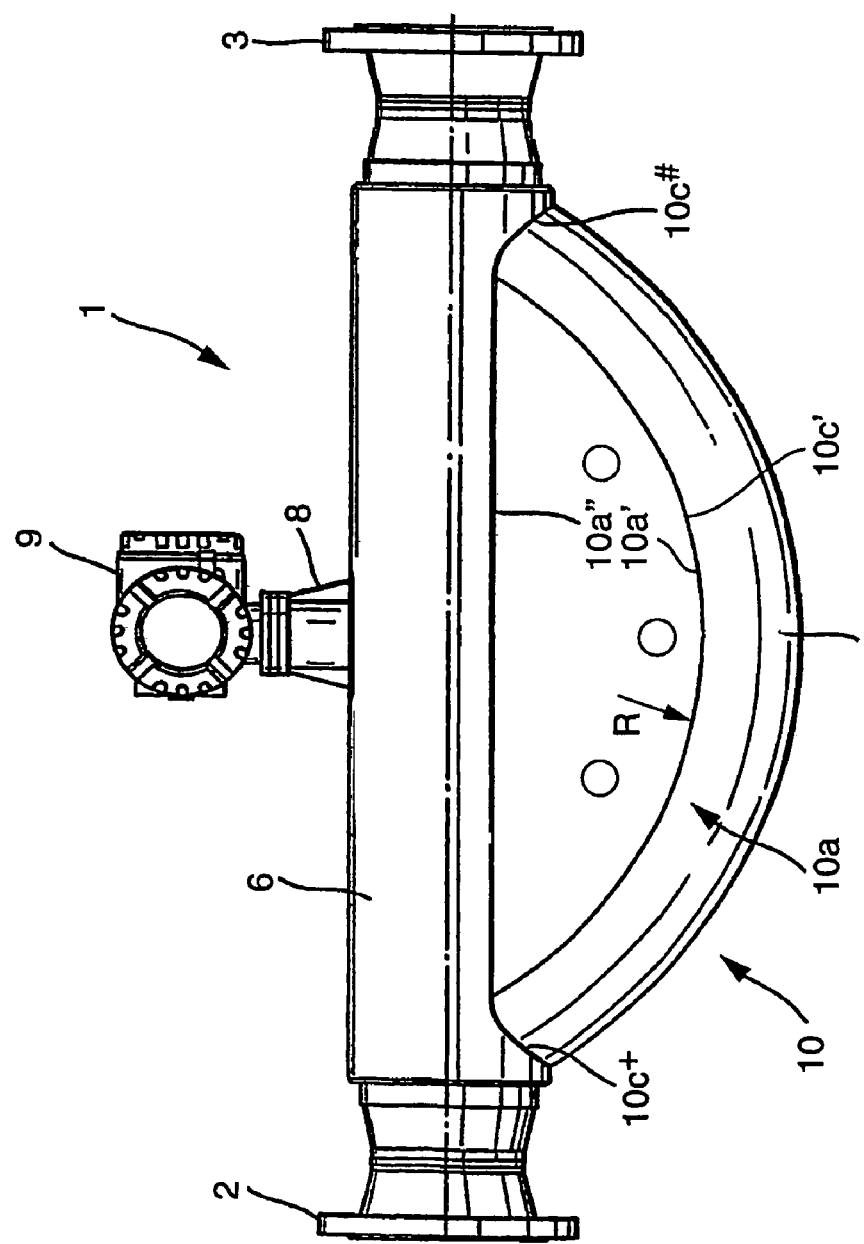
Fig. 3a
Fig. 3b

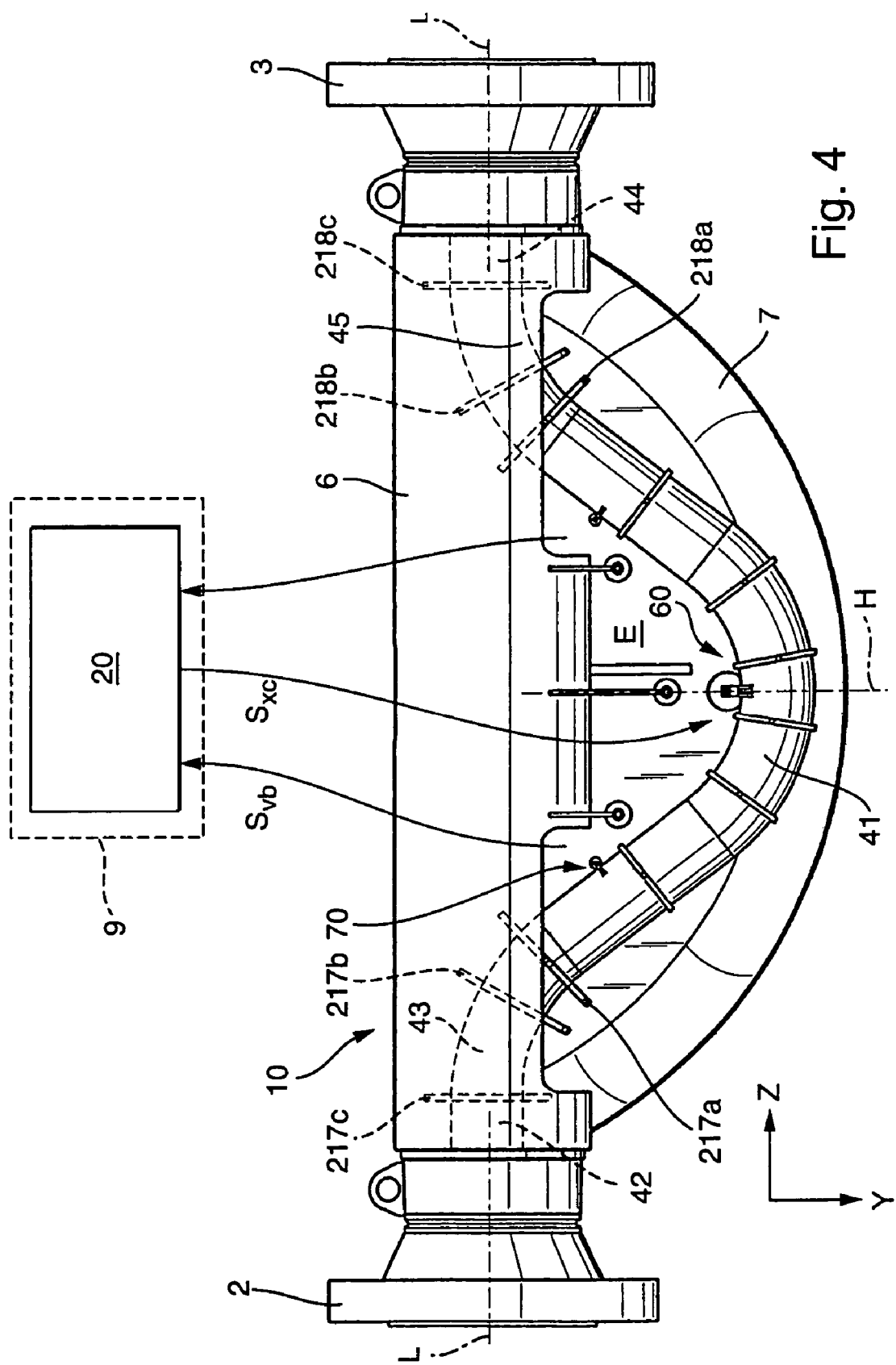

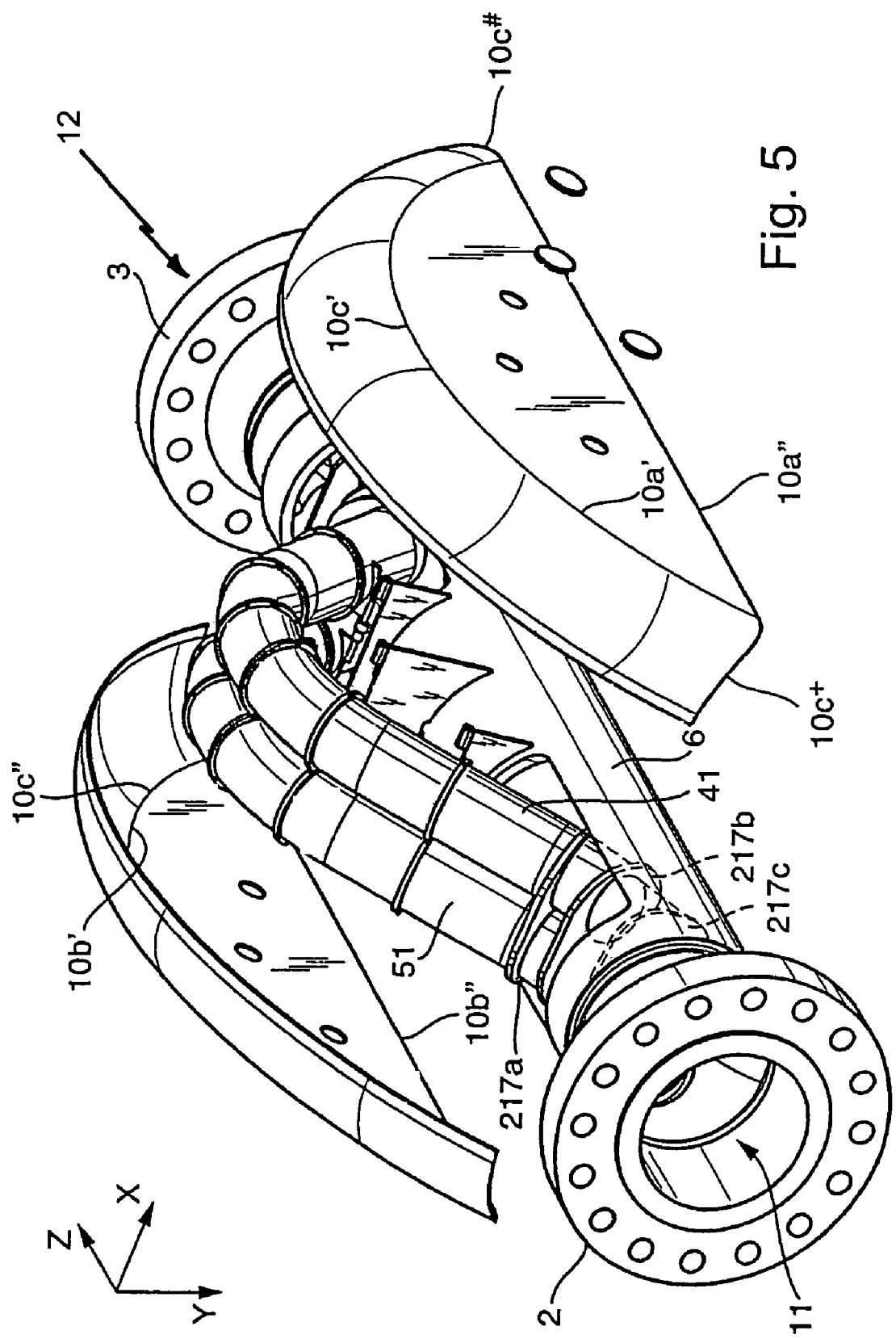

VIBRATORY MEASUREMENT TRANSDUCER

FIELD OF THE INVENTION

The invention relates to a vibration-type measurement transducer for measuring a flowable medium, especially a gas, liquid, powder or other flowable substance, conveyed in a pipeline.

BACKGROUND OF THE INVENTION

In the technology of process measurements and automation, physical parameters, such as e.g. mass flow rate, density and/or viscosity, of a medium flowing in a pipeline are often measured using inline measuring devices, which include a vibratory measurement transducer, through which the medium flows, and a measurement and operating circuit connected thereto, for effecting reaction forces in the medium, such as e.g. Coriolis forces corresponding to the mass flow rate, inertial forces corresponding to the density of the medium and/or frictional forces corresponding to the viscosity of the medium, etc., and for producing, derived from these forces, measurement signals respectively representing mass flow rate, density and viscosity.

Such measurement transducers, especially those in the form of Coriolis mass flow meters or Coriolis mass flow/density meters, are described in detail e.g. in WO-A 04/099735, WO-A 04/038341, WO-A 03/076879, WO-A 03/027616, WO-A 03/021202, WO-A 01/33174, WO-A 00/57141, WO-A 98/07009, U.S. Pat. Nos. 6,807,866, 6,711,958, 6,666,098, 6,308,580, 6,092,429, 5,796,011, 5,301,557, 4,876,898, EP-A 553 939, EP-A 1 001 254, EP-A 12 48 084, EP-A 1 448 956, or EP-A 1 421 349. For conveying the medium flowing at least at times, the measurement transducers include at least one flow tube, which is secured appropriately to a usually thicker-walled, especially tubular and/or beam-like, support cylinder or in a support frame. Additionally, the aforementioned measurement transducers have a second flow tube, which likewise vibrates, at least at times, and is mechanically coupled with the first flow tube at least via two, especially, however, four, coupling elements, also named node plates or couplers, with at least the first flow tube being constructed as a first measuring tube communicating with the pipeline and serving for conveying the medium to be measured. For producing the above-mentioned reaction forces, the two flow tubes are caused to vibrate during operation, driven by a usually electrodynamic exciter arrangement, with the two flow tubes usually executing bending oscillations, at least at times, about an imaginary oscillation axis essentially parallel to a longitudinal axis of the measurement transducer. For detecting vibrations of the flow tube, especially inlet and outlet end vibrations, and for producing at least one oscillation measurement signal representing such, such measurement transducers additionally include a sensor arrangement reacting to movements, and thus also to mechanical oscillations, of the flow tube.

During operation, the above-described, internal oscillation system of the measurement transducer, formed by the at least one flow tube, the medium conveyed at least instantaneously therein, as well as at least partly by the exciter arrangement and the sensor arrangement, is excited by means of the electromechanical exciter arrangement at least at times in a wanted oscillation mode to execute mechanical oscillations at at least one dominating, wanted oscillation frequency. These oscillations in the so-called wanted oscillation mode are usually, at least partly, in the form of lateral oscillations, especially when the measurement transducer is used as a Coriolis mass flow and/or density meter. Usually chosen as the wanted oscillation frequency in such cases is a natural, instantaneous, resonance frequency of the internal oscillation system, which, in turn, depends both on the size, shape and material of the flow tube and also on an instantaneous density of the medium; if necessary, the wanted oscillation frequency can also be significantly influenced by an instantaneous viscosity of the medium. Due to fluctuating density of the medium to be measured and/or due to medium changes occurring during operation, the wanted oscillation frequency during operation of the measurement transducer is naturally changeable at least within a calibrated and, thus, predetermined, wanted frequency band, which, correspondingly, has a predetermined lower, and a predetermined upper, limit frequency. The internal oscillation system of the measurement transducer formed in common by the at least one flow tube, together with the exciter and sensor arrangements, is, additionally, usually accommodated by a housing having the support frame, or support cylinder, as integral component, with the housing being mechanically coupled to the pipeline via an inlet end and an outlet end and likewise exhibiting a plurality of natural oscillation modes. Suitable transducer housings for vibratory measurement transducers are described, for example, in WO-A 03/076879, WO-A 03/021202, WO-A 01/65213, WO-A 00/57141, U.S. Pat. Nos. 6,776,052, 6,711,958, 6,044,715, 5,301,557, or EP-A 1 001 254.

Progress in the field of vibratory measurement transducers has, in the meantime, reached a level where modern measurement transducers of the described kind can be applied in practice for almost all purposes in the technology of flow measurements and can satisfy the highest requirements existing in such field. Thus, such measurement transducers can be applied to measure mass flow rates of only a few g/h (grams per hour) up to some t/h (tonnes per hour), and pressures of up to 100 bar for liquids, or even over 300 bar for gases. The accuracy of measurement achieved in such applications lies, usually, at about 99.9% of the actual value, or even above, i.e. a measurement error of about 0.1%, while a lower limit of the guaranteed measurement range can lie quite well at about 1% of the end value of the measurement range. On the basis of the high bandwidth, measurement transducers of the described kind can be offered, depending on application, also with nominal diameters, as measured at the flange, lying between 1 mm and 250 mm, or even beyond.

Investigations on vibratory measurement transducers having two, mutually parallel, curved flow tubes, such as are described e.g. in U.S. Pat. No. 6,711,958 or U.S. Pat. No. 6,308,580, have shown, however, that, despite a largely symmetrical construction with reference to an imaginary central plane of the measurement transducer extending between the two curved central tube segments of the flow tubes, alternating imbalances can be produced in significant measure in the rhythm of the wanted oscillation frequency and, consequently, associated disturbance oscillations can be coupled out into the connected pipeline. Proving to be especially harmful, in this regard, for the required, high measurement accuracy are those disturbance oscillations which act in the direction of that principal axis of inertia of the measurement transducer—in the following designated the vertical axis—which lies in the aforementioned, imaginary central axis of the measurement transducer and extends essentially perpendicular to the axis of the oscillations. To diminish such disturbance oscillations, especially those directed transversely to the oscillation axis, it is proposed both in EP-A 12 48 084 and in WO-A 04/099735 to apply a cantilever-like balance-element to a curved, central, middle tube segment of each of the two flow tubes. The effect of such balance elements lies essentially in their ability to generate acceleration forces directed counter to the acceleration forces produced by the vibrating flow tubes and directed, in the above sense, vertically to the oscillation axis, so that these forces partially cancel one another. Further investigations have, moreover, shown that, in the case of measurement transducers of the described type, especially those with V-shaped or trapezoidally bent, flow tubes and/or with flow tubes whose tube diameters amount to 80 mm or more, besides such forces coming mainly from the acceleration of moved masses, to an increasing degree, also clamping forces can also lead to significant imbalances in the measurement transducer, such as are dependent on an asymmetric deformation of the transducer housing stemming from an instantaneous deflection of the flow tubes.

FIGS. 1 and 2 are two schematic sketches for explaining the oscillatory motion in the case of a measurement transducer of the described kind having two curved, mutually parallel, flow tubes, which are mechanically coupled together at the inlet and outlet ends via, in each case, two coupling elements. The flow tubes are shown here schematically in simplified form and shown cut free at the ends, thus free of the transducer housing which otherwise holds them, so that they can, therefore, oscillate virtually at their ends. As already mentioned, the two flow tubes oscillate, during operation, relative to one another, and, indeed, in a way such that they deflect laterally (X-direction) practically over their entire lengths. The amplitudes of these deflections may differ from one another. The predominant part of the oscillations and of the associated forces is thus both perpendicular to the oscillation axis (Z-direction) and to the mentioned vertical axis (Y-direction) of the measurement transducer, wherein, at least for the case that both flow tubes are flowed through at the same time by the medium, the component of the one flow tube essentially cancels the corresponding component of the other flow tube. A smaller component of the forces caused by the oscillations acts also in the direction of the vertical axis (Y-direction). The oscillatory motion of the flow tubes is, in spite of the coupling elements, transmitted through to the—here free—ends, with also the coupling elements being slightly deformed (FIG. 2). The middles of the coupling elements move in such case also in the direction of the vertical axis, while the "free" ends of the flow tubes move oppositely in the direction of the vertical axis. This movement of the ends of the flow tubes leads in the installed and fixed state inversely to forces in the securing transducer housing, for example in the possible, connected distributor pieces, and, thus, also to deformations of the transducer housing.

A possibility for reducing such undesired forces in the mounting, which, for example, can vary a calibrated zero point of the measurement transducer, would, for example, be correspondingly to increase a stiffness of the transducer housing resisting the aforementioned deformations of the transducer housing by increasing its wall thickness. However, a special problem connected with such a measure is that, in the case of measurement transducers of large nominal diameter, the installed mass is already very high. For measurement transducers of nominal diameter far in excess of 150 mm, including flanges possibly attached thereto, the installed mass can lie easily at about 500 kg. Thus, in the case of measurement transducers of large nominal diameter, the possibilities for sufficient stiffening of the transducer housing by increased material thicknesses must be considered as very limited, at least for the desired application of proven materials, especially stainless steel.

SUMMARY OF THE INVENTION

Proceeding from the above-related state of the art, it is thus an object of the invention to provide vibratory measurement transducers which, especially while largely retaining already established and proven forms of construction, also with large nominal diameters in excess of 150 mm, exhibit as high a measurement accuracy as possible, thus of 99.8% or more, and thus a measurement error of less than 0.02%.

For achieving the object, the invention provides a measurement transducer of vibration-type for measuring a flowable medium, for instance a gas, liquid, powder or other flowable substance, conveyed in a pipeline, including:
  a transducer housing, which is mechanically coupled with the pipeline via an inlet end and an outlet end;
  at least one first flow tube held in an oscillatable manner in the transducer housing and vibrating at least at times, and a second flow tube mechanically coupled with the first flow tube and likewise vibrating at least at times;
  with the first flow tube and the second flow tube executing during operation, at least at times, bending oscillations each about an imaginary oscillation axis extending essentially parallel to a longitudinal axis of the measurement transducer, and
  with at least the first flow tube being embodied as a first measuring tube communicating with the pipeline and serving to convey the medium to be measured;
  an electromechanical, i.e. electrodynamic, exciter arrangement acting on at least one of the flow tubes for producing and/or maintaining mechanical oscillations of the at least one flow tube;
  a sensor arrangement reacting to movements at least of the first flow tube, especially to bending oscillations, for producing at least one oscillation measurement signal representing oscillations of the first flow tube; as well as
  at least three coupling elements, for example plate-shaped coupling elements, connecting the first and second flow tubes together at their inlet ends, as well as at least three coupling elements, for example plate-shaped coupling elements, connecting the first and second flow tubes together at their outlet ends.

Additionally, the invention includes that the measurement transducer for measuring a flowable medium conveyed in a pipeline has a caliber of greater than 150 mm, for example of 250 mm or more, and/or is for measuring a mass flow rate of a medium flowing through a pipeline in amounts at least at times greater than 900 t/h, for example, at least at times, more than 1200 t/h.

According to a first embodiment of the measurement transducer of the invention, the two flow tubes oscillate during operation with phases essentially opposite to one another.

In a second embodiment of the measurement transducer of the invention, each of the two flow tubes has an at least sectionally curved, for example essentially U-, V- or trapezoid-shaped, central, middle tube segment.

A third embodiment of the measurement transducer of the invention provides that the inlet-end coupling elements and the outlet-end coupling elements are so arranged and fixed on the two flow tubes that those clamping forces produced by the vibrating flow tubes within the transducer housing are minimized, which act predominantly in the direction of that principal axis of inertia of the measurement transducer, that runs essentially perpendicular to the longitudinal axis and lies essentially in an imaginary central plane of the measurement transducer extending between the two curved middle tube segments of the flow tubes.

According to a fourth embodiment of the measurement transducer of the invention, each of the two flow tubes has at an inlet end a straight inlet tube segment extending essentially parallel to the imaginary oscillation axis. The inlet tube segment communicates with its middle tube segment via an inlet-end, curved, intermediate tube segment. In turn, each of the two flow tubes has at an outlet end a straight outlet tube segment extending essentially parallel to the imaginary oscillation axis. The outlet tube segment communicates with its middle tube segment via an outlet-end, curved, intermediate tube segment.

In a fifth embodiment of the measurement transducer of the invention, there are at least one first and at least one second coupling element of the coupling elements connecting the two flow tubes on the inlet end with one another, which coupling elements are each affixed to the inlet-end, intermediate tube segments of the first and second flow tubes, and there are at least one first and at least one second coupling element of the coupling elements connecting the two flow tubes on the outlet end with one another, which coupling elements are each affixed to the outlet-end, intermediate tube segments of the first and second flow tubes.

A sixth embodiment of the measurement transducer of the invention provides that at least one, third coupling element of the coupling elements connecting the two flow tubes together on the inlet end is fixed to the inlet-end tube segment of the first and second flow tubes and that at least one, third coupling element of the coupling elements connecting the two flow tubes together on the outlet end is fixed to the outlet-end tube segment of the first and second flow tubes.

According to a seventh embodiment of the measurement transducer of the invention, the first flow tube runs essentially parallel to the second flow tube.

In an eighth embodiment of the measurement transducer of the invention, the first measurement transducer tube is essentially constructed identically to the second measurement transducer tube.

A ninth embodiment of the measurement transducer of the invention includes, additionally, a first distributor piece connecting the first and second flow tubes together at the inlet end, as well as a second distributor piece connecting the first and second flow tubes together at the outlet end, with the second flow tube likewise being constructed as a second measuring tube serving for the conveying of the medium to be measured and for communicating with the pipeline. According to a further development of this embodiment of the invention, each of the two distributor pieces has a mass of more than 10 kg, for example more than 20 kg.

According to a tenth embodiment of the measurement transducer of the invention, the transducer housing includes a support element, for example one of steel, to which the at least one flow tube is mechanically connected at its inlet and outlet ends. In a further development of this embodiment of the invention, the support element is constructed in the form of support cylinder, for example a tubular support cylinder, which is at least partially laterally open. The support cylinder is connected with the at least one flow tube such that its at least one, curved tube segment protrudes laterally out of the support cylinder. According to another embodiment of this further development of the invention, the support element has a mass of at least 70 kg, for example more than 140 kg, and/or a length of at least 1000 mm, for example of more than 1200 mm.

In an eleventh embodiment of the measurement transducer of the invention, each of the flow tubes, as well as the transducer housing, is made, at least in part, of steel, for example stainless steel.

A twelfth embodiment of the measurement transducer of the invention provides that each of the flow tubes has a mass of at least 10 kg, for example of greater than 25 kg.

According to a thirteenth embodiment of the measurement transducer of the invention, each of the flow tubes has an inner diameter of at least 80 mm, for example greater than 100 mm.

In a fourteenth embodiment of the measurement transducer of the invention, each of the flow tubes has a cross section whose area moment of inertia is greater than $2 \times 10^4$ mm$^3$, for example greater than $4 \times 10^6$ mm$^4$.

In a fifteenth embodiment of the measurement transducer of the invention, each of the flow tubes has a cross section whose section modulus resisting bending is greater than $10^6$ mm$^4$, for example greater than $2 \times 10^6$ mm$^4$.

According to a sixteenth embodiment of the measurement transducer of the invention, each of the flow tubes has a stretched length of at least 1000 mm, for example greater than 1500 mm.

A seventeenth embodiment of the measurement transducer of the invention provides that each of the middle tube segments of the two flow tubes has an essentially V-shape and each of the middle tube segments of the two flow tubes has a peak with an included angle smaller than 150°, for example smaller than 120°.

According to an eighteenth embodiment of the measurement transducer of the invention, an internal oscillation system of the measurement transducer is formed by the two flow tubes, the medium at least instantaneously conveyed therein, and at least in part by the exciter arrangement and the sensor arrangement, and the internal oscillation system, driven by the exciter arrangement, executes during operation of the measurement transducer, at least at times, mechanical oscillations, for example in the form of lateral oscillations, with at least one wanted oscillation frequency, which depends both on the size, shape and material of the flow tube and on an instantaneous density of the medium, and which is changeable during operation of the measurement transducer, within a predetermined wanted frequency band having upper and lower limit frequencies. In a further development of this embodiment of the invention, a total mass of the internal oscillation system amounts to at least 70 kg, and for example during operation, at least at times, to more than 90 kg.

In a nineteenth embodiment of the measurement transducer of the invention, an external oscillation system of the measurement transducer is formed by the transducer housing and at least by the distributor pieces, while an internal oscillation system of the measurement transducer is formed by the two flow tubes, the medium at least instantaneously conveyed therein and at least in part by the exciter arrangement and the sensor arrangement, and the internal oscillation system, driven by the exciter arrangement, executes during operation of the measurement transducer, at least at times, mechanical oscillations, for example in the form of lateral oscillations, having at least one wanted oscillation frequency, which depends both on the size, shape and material of the flow tube and on an instantaneous density of the medium, and which is changeable during operation of the measurement transducer within a predetermined wanted frequency band having lower and upper limit frequencies. According to a further development of this embodiment of the invention, a total mass of the external oscillation system amounts to at least 200 kg, for example to more than 300 kg. In another further development of this embodiment of the invention, a mass ratio of a total mass of the external oscillation system to a total mass of the internal oscillation system is, during operation, at least at times, for example, however, continuously, smaller than 3, for example smaller than 2.5.

According to a twentieth embodiment of the measurement transducer of the invention, an installed mass to nominal diameter ratio of an installed mass of the total measurement transducer to a nominal diameter of the measurement transducer, which corresponds to a caliber of the pipeline in whose course the measurement transducer is to be installed, amounts to at least 1.5, for example more than 2.

In a twenty-first embodiment of the measurement transducer of the invention, the installed mass of the total measurement transducer is greater than 200 kg, for example greater than 400 kg.

A basic idea of the invention is to suppress the disturbance oscillations produced by means of the at least six coupling elements possibly in the end regions of the vibrating flow tubes, for example in the region of the intermediate segments, for example disturbance oscillations acting in the direction of the vertical axis of the measurement transducer. The invention is based here on the surprising discovery that through the use of at least 2×3 coupling elements and their arrangement each in the region of the intermediate segments, as compared to conventional measurement transducers with 2×2 coupling elements, an effective direction especially of oscillation-based deformations in the transducer housing, or of clamping forces arising in the distributor pieces, can be rotated into a direction less damaging for the measurements and, at the same time, at least the disturbance oscillations otherwise acting in the direction of the vertical axis can also be considerably minimized. Thus, the at least three coupling elements mounted on the flow tubes at the inlet end and the at least three coupling elements mounted on the flow tubes at the outlet end act, from a practical point of view, as mechanical polarization filters, which are so constructed that at least disturbance oscillations acting in the direction of the vertical axis of the measurement transducer are suppressed or even eliminated.

An advantage of the invention is, among other things, that, compared to conventional measurement transducers with four coupling elements, already the use of two additional coupling elements and, thus, in comparison to conventional measurement transducers, without great additional effort, a large, and, in the best case, even an almost complete, canceling of the most disturbing clamping forces, especially those acting in the direction of the vertical axis of the measurement transducer, can be realized. Thus, a further advantage of the invention can be seen in the fact that such leads to a possibility for realizing vibration-type measurement transducers even at large nominal diameters of over 150 mm, especially at nominal diameters of greater than 200 mm, which are both economically reasonable and also have an installed mass which is manageable. A further advantage of the invention is that, at the same time, already established and proven construction forms, especially with respect to the flow tubes, can also largely be retained.

The measurement transducer of the invention is, consequently, also suitable for the measurement of flowable media, which are conveyed in a pipeline having a caliber of greater than 150 mm, especially of 250 mm or above.

Moreover, the measurement transducer is also suited for the measurement of mass flow rates, which are, at least at times, greater than 900 t/h, especially, at least at times, more than 1200 t/h, such as can arise e.g. in the case of applications for measuring oil, natural gas or other petrochemical substances.

BRIEF DESCRIPTION OF THE DRAWINGS

The invention will now be explained in greater detail on the basis of examples of embodiments and the figures of the drawing. Functionally equal parts are provided in the separate figures with the same reference characters, which, however, are repeated in subsequent figures only when such appears helpful.

FIGS. 4 to 6 show, in different, partially sectioned side views, details of a vibration-type measurement transducer suited for an inline measuring device as shown in FIGS. 3a, b.

DETAILED DESCRIPTION OF EXEMPLARY EMBODIMENTS

Figure 2:
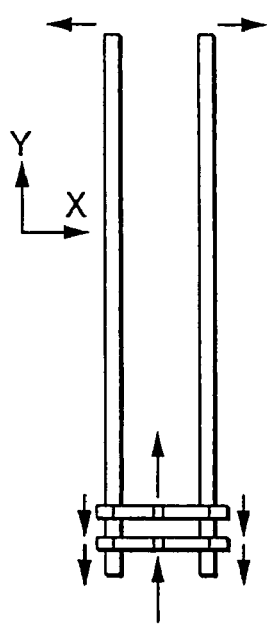
FIGS. 1, 2 are schematic sketches of different side views for explaining the oscillatory motion of conventional measurement transducers, FIGS. 3a, b show different side views of an inline measuring device serving, for example, as a Coriolis mass flow/density and/or as a viscosity measuring device.
Figure 1:
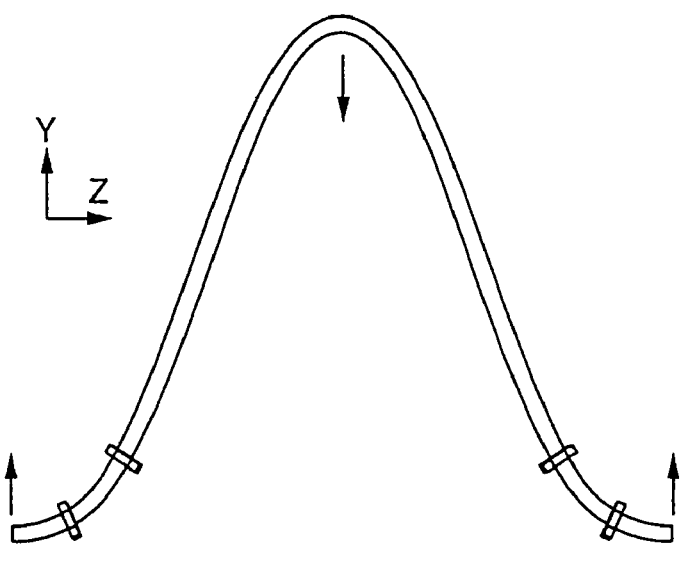

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

FIGS. 3a, b show an inline measuring device 1, especially one constructed as a Coriolis mass flow and/or density measuring device, serving, for example, for registering a mass flow rate m of a medium flowing in a pipeline (not shown) and for mapping such into a mass flow rate, measured value $X_m$ instantaneously representing this mass flow rate. The medium can be practically any flowable substance, for example a powder, a liquid, a gas, a vapor, or the like. Alternatively, or in supplementation, the inline measuring device 1 can also be used, if desired, to measure a density ρ and/or a viscosity η of the medium. In particular, the measurement transducer is provided for measuring media such as oil, natural gas or other petrochemical substances, which flow in a pipeline having a caliber of greater than 150 mm, especially a caliber of 250 mm or greater, and/or which exhibit, at least at times, a mass flow rate of greater than 900 t/h, especially greater than 1200 t/h.

For measuring the medium, the inline measuring device includes a vibration-type measurement transducer 10, through which the medium flows during operation, as well as a measuring device electronics 20 (shown here only schematically in the form of a labeled block) electrically connected with the measurement transducer 10. Advantageously, the measuring device electronics 20 is designed such that it can, during operation, exchange measurement and/or other operational data with a measured value processing unit, for example a programmable logic controller (PLC), a personal computer and/or a work station superordinated thereto, via a data transmission system, for example a field bus system. Additionally, the measuring device electronics is designed such that it can be fed from an external power supply, for example even over the aforementioned field bus system. For the case that the inline measuring device is to be coupled to a field bus or other communication system, the measuring device electronics 20, especially a programmable version thereof, additionally has a corresponding communications interface for a data communications, e.g. for transmitting measured data to the above-mentioned programmable logic controller or a superordinated process control system.

FIGS. 3a, b, and 4 to 6 show in various types of drawings an example of an embodiment of a measurement transducer 1 serving especially as a Coriolis mass flow, density and/or viscosity transducer. As already mentioned, the measurement transducer 1 serves to produce in a through-flowing medium mechanical reaction forces, especially Coriolis forces dependent on mass flow rate, inertial forces dependent on density of the medium and/or frictional forces dependent on the viscosity of the medium, forces which react measurably, that is registerably by sensor, on the measurement transducer. Derived from these reaction forces describing the medium, for example the mass flow rate, the density and/or the viscosity of the medium can be measured by means of evaluation processes correspondingly implemented in the measuring device electronics in manner known to those skilled in the art. The measurement transducer 1 is, in operation, inserted via flanges 2, 3 into the course of a pipeline (not shown) flowed through by a medium to be measured, especially a powdered, liquid, gaseous or vaporous medium. Instead of flanges, the measurement transducer 1 can also be connected to said pipeline by other known means, such as e.g. triclamp, or screwed, connections.

Figure 6:
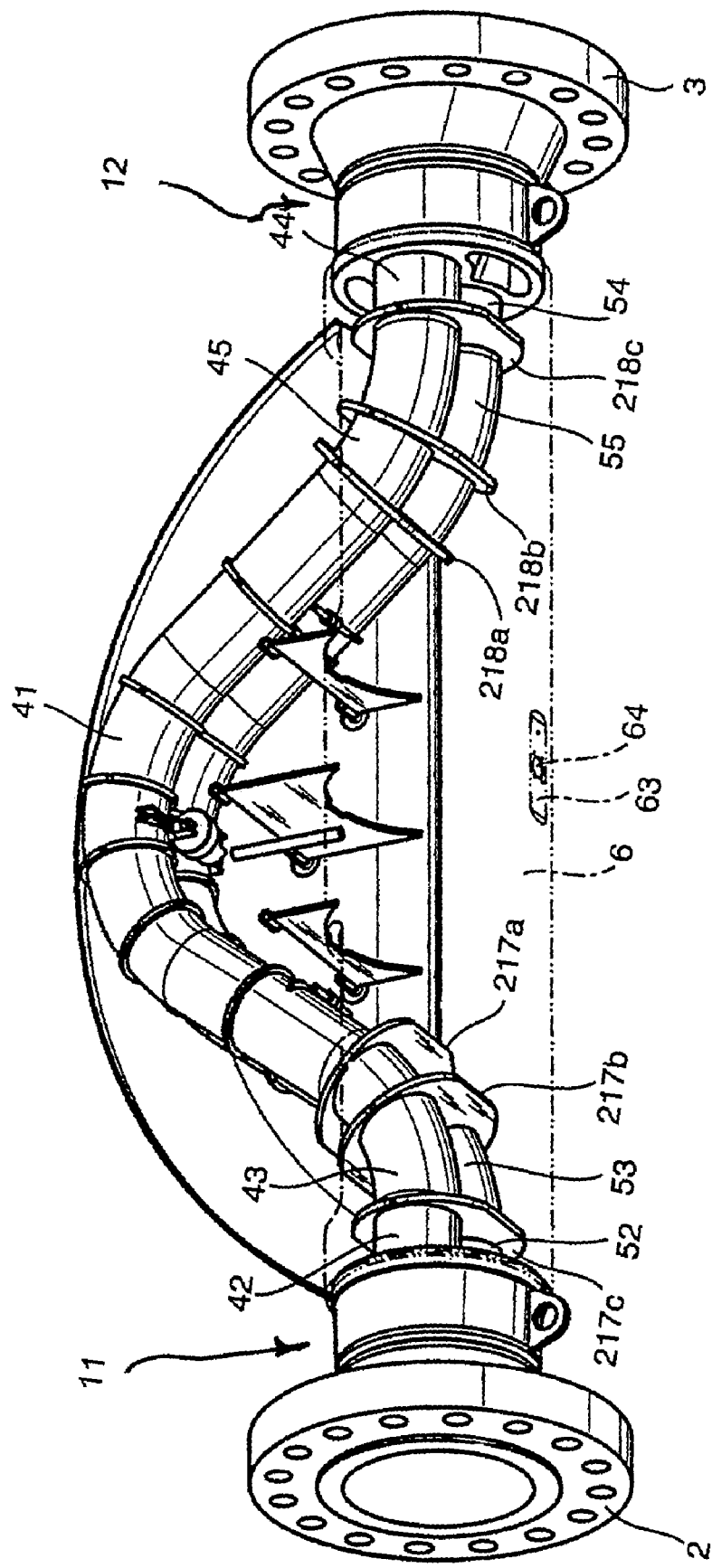

For conveying at least a portion of the medium to be measured, the measurement transducer includes at least one flow tube 4 serving as measuring tube and held oscillatably in a transducer housing 10. In use, tube 4 communicates with the pipeline and, driven by an electromechanical exciter arrangement 60, is caused to vibrate, at least at times, in at least one oscillation mode suited for determining the physical, measured, variable. Besides the especially one-piece flow tube 4, there is provided, additionally, as shown in FIGS. 5 and 6, a second flow tube 5 in the measurement transducer. Tube 5, which is essentially identical to tube 4, likewise communicates with the pipeline and thus serves as second measuring tube of the measurement transducer. During operation, tube 5 likewise executes mechanical oscillations. The oscillations at least of the first flow tube are registered by a sensor arrangement reacting to its movements, especially its bending oscillations, and are converted into an oscillation measurement signal $s_{vb}$ representing the oscillations. Thus, practically the entire internal oscillation system of the measurement transducer 1, formed by the two flow tubes 4, 5, the medium at least instantaneously conveyed therein, and at least partially by the exciter and sensor arrangements 60, 70, executes during operation of the measurement transducer 1, at least at times, mechanical oscillations with at least one wanted oscillation frequency $F_n$, with the mechanical oscillations being at least at times, and/or at least partially, lateral oscillations, especially bending oscillations. The wanted oscillation frequency $F_n$ is, at the same time, in manner known to those skilled in the art, dependent both on size, shape and material of the two flow tubes 4, 5 and also, especially, on an instantaneous density of the medium, and, thus, during operation of the measurement transducer, variable within a predetermined, wanted frequency band $\Delta F_n$ exhibiting upper and lower limit frequencies. During operation of the measurement transducer, the instantaneous wanted oscillation frequency $F_n$ of the internal oscillation system is advantageously controlled and adjusted, such that it corresponds essentially to an instantaneous, natural eigenfrequency of the internal oscillation system.

The two, especially at least sectionally, mutually parallel flow tubes can, as indicated in FIGS. 5 and 6 and shown, for example, also in U.S. Pat. Nos. 6,711,958, 5,796,011, 5,301,557, be connected together by means of distributer pieces 11, 12 into flow paths flowed through in parallel during operation; they can, however, also, as shown e.g. in U.S. Pat. No. 6,044,715, be connected serially together on the basis of sequentially arranged flow paths. It is, however, also possible, as, for instance, proposed in U.S. Pat. No. 6,666,098 or U.S. Pat. No. 5,549,009, to use only one of the two flow tubes as measuring tube for the conveying of medium and the other as a blind tube not conveying medium to be measured and serving, instead, for the reduction of intrinsic imbalances in the measurement transducer. According to an advantageous embodiment of the invention, each of the two flow tubes 4, 5 has at least one middle, tube segment 41, 51 bent at least sectionally in at least one plane. The flow tubes 4, 5 can, in this connection, as shown in U.S. Pat. No. 6,776,052, have a clearly U-shaped form, for example, or, as proposed in U.S. Pat. No. 6,802,224 or U.S. Pat. No. 6,711,958 and shown in FIGS. 4-6, be given an essentially V-shape. Furthermore, the flow tubes can be bent only slightly, as described e.g. in U.S. Pat. No. 5,796,011, or, rather, rectangularly or trapezoidally, as shown e.g. in WO-A 01/65213, U.S. Pat. Nos. 6,308,580, 6,092,429, 6,044,715. Suited as material for the flow tubes are, especially, steel, especially stainless steel, titanium, zirconium or tantalum. Beyond this, however, the material for the flow tubes can be practically any material usually used, or at least suited, therefore.

In the illustrated example of an embodiment, at least the middle tube segments 41, 51 of the two flow tubes 4, 5 are excited at least partially during operation by the action of the electromechanical exciter arrangement 60 at least partly affixed thereto to execute cantilever-type vibrations, in which they are laterally deflected out of the above-mentioned plane and oscillate with essentially opposite phase relative to one another. In doing this, the first and second flow tubes execute, at least at times during operation, bending oscillations about an imaginary oscillation axis essentially parallel to a longitudinal axis L of the measurement transducer. Said differently, at least the middle tube segments 41, 51 are caused to oscillate in a bending oscillation mode, in the manner of cantilevers clamped at one end, or the tines of a tuning fork. In a further development of the invention, each of the two central, middle tube segments is curved in essentially V-shape or even trapezoidally. In a further development of this embodiment of the invention, each of the two flow tubes 4, 5 includes, additionally, on the inlet end a straight inlet tube segment running essentially parallel to the imaginary oscillation axis. Each of these inlet tube segments is in communication with the middle tube segment of its tube, via a curved, inlet-end, intermediate tube segment. Also, each of the two flow tubes 4, 5 includes, additionally, on the outlet end a straight inlet tube segment running essentially parallel to the imaginary oscillation axis. Each of these outlet tube segments is in communication with the middle tube segment of its tube, via a curved, outlet-end, intermediate tube segment. In another development of this embodiment of the invention, each of the middle tube segments exhibits a peak having an included angle smaller than 150°, especially smaller than 120°.

As already mentioned, the measurement transducer 1 is provided especially also for measurements of high mass flow rates in a pipeline of large caliber. Due to this, a further embodiment of the measurement transducer 1 provides that at least the flow tube 4 serving as measuring tube has an inner diameter measuring at least 80 mm. Especially, at least the flow tube 4 is constructed such that its inner diameter is greater than 100 mm, especially even greater than 110 mm. In a further embodiment of the invention, the flow tube 4 has, moreover, a cross section whose area moment of inertia is greater than $2 \times 10^4$ mm$^3$, especially greater than $4 \times 10^6$ mm$^4$ and/or whose section modulus resisting bending is greater than $10^6$ mm$^4$, especially greater than $2 \times 10^6$ mm$^4$. Additionally, in another embodiment of the invention, the flow tube 4 serving as measuring tube is designed such that it has a stretched length of at least 1000 mm, especially greater than 1500 mm. Consequently, at least for the case that the flow tube 4 is of steel, this example results in a mass of at least 10 kg, at least for a wall thickness of somewhat over 1 mm. In a further embodiment of the invention, at least the flow tube 4 is, however, dimensioned such that, due to a relatively great wall thickness of about 5 mm and/or a relatively large stretched length of about 2000 mm, it has a mass of more than 25 kg. It is also to be noted here, that the second flow tube 5, at least for the case that it likewise serves as measuring tube, is arranged essentially parallel to the flow tube 4 and is constructed essentially identically to the first flow tube 4, and, thus, exhibits both the same physical properties and the same geometric properties. Considering that, as a consequence of the special dimensioning, each of the flow tubes 4, 5 weighs well over 10 kg, and, can, therefore, as is clearly evident from the above measurements-data, exhibit a capacity of 10 l or more, then the internal oscillation system, which includes the two flow tubes 4, 5, can, at least when a medium of high density is flowing therethrough, reach a total mass of well over 50 kg. Especially in the case of use of flow tubes of relatively large inner diameter, wall thickness and stretched length, the mass of the internal oscillation system can, consequently, easily be greater than 70 kg, or, at least when medium is flowing therethrough, more than 90 kg.

Besides the transducer housing 10 and the flow tubes 4, 5 held therein, the measurement transducer 1 includes an electromechanical, especially electrodynamic, exciter arrangement 60 acting on the at least one flow tube 4 for producing and/or maintaining mechanical oscillations. Furthermore, the measurement transducer includes a sensor arrangement 70 reacting to mechanical oscillations, for example bending oscillations, of the flow tube 4 for producing at least one oscillation measurement signal $s_{vb}$ representing oscillations of the flow tube 4. At least the two flow tubes 4, 5, as well as components additionally fixed thereon, such as e.g. part of the exciter arrangement 69 and part of the sensor arrangement 70, thus comprise, for practical purposes, an internal oscillation system of the measurement transducer.

For producing and/or maintaining mechanical oscillations of at least one flow tube, the exciter arrangement 60 of the illustrated example of an embodiment has at least one oscillation exciter arranged on the two flow tubes 4, 5, in each case in the region of the peak, especially about, in each case, at the middle, or halfway point, of the tube length. The oscillation exciter can be, for example, one of the electrodynamic types, thus an oscillation exciter realized by means of a magnet coil fixed to the flow tube 5 and an armature correspondingly fixed to the other flow tube 4 and plunging into the coil.

For registering vibrations, at least of the one flow tube 4, and for producing the at least one oscillation measurement signal $s_{vb}$ representing oscillations of the flow tube 4, there is, as already mentioned, a sensor arrangement provided, by means of which vibrations, especially vibrations at the inlet and outlet ends, of the tube segment 41 can be signalized and fed for further electronic processing, in the manner usual for such measurement transducers. In the illustrated example of an embodiment, the sensor arrangement includes, for this purpose, a first oscillation sensor arranged on the flow tubes at the inlet ends, and a second oscillation sensor arranged on the flow tubes 4, 5 at the outlet ends. Especially, the second oscillation sensor is essentially identical to, or built the same as, the first oscillation sensor. The oscillation sensors can likewise be of the electrodynamic type, thus each comprised of magnet coils fixed to the sensor tube 5 and armatures fixed correspondingly on the other flow tube 4 for plunging in the magnet coils. Beyond this, also other oscillation sensors known to those skilled in the art, for example optoelectronic oscillation sensors, can be used. For determining the at least one physical, measured variable on the basis of the at least one oscillation measurement signal $s_{vb}$, the exciter arrangement 60 and the sensor arrangement 70 are additionally, as is usual in the case of such measurement transducers, coupled in suitable manner, for instance galvanically and/or optoelectronically, to a measuring and operating circuit correspondingly provided in the measuring device electronics 20. The measurement and operating circuit, in turn, produces, on the one hand, an exciter signal $s_{xc}$ correspondingly driving the exciter arrangement 60 and controlled, for example, with respect to an exciter current and/or an exciter voltage. On the other hand, the measuring and operating circuit receives the at least one oscillation measurement signal $s_{vb}$ of the sensor arrangement 70 and generates therefrom desired measured values, which can represent, for example, a mass flow rate, a density and/or a viscosity of the medium being measured and which, if necessary, can be displayed on location or, if necessary, further processed at a higher level. The measuring device electronics 20, including the measuring and operating circuit, can, for example, be accommodated in a separate electronics housing 9, which is arranged remotely from the measurement transducer or it can be attached directly to the measurement transducer 1, for example externally on the transducer housing 10, in which case a single, compact device is formed. In the case of the example of an embodiment illustrated here, a neck-like transition piece 8 is, therefore, additionally mounted on the transducer housing to serve for attachment of the electronics housing 9. In FIGS. 4 to 6, the transition piece 8 and the electronics housing 9 are, however, omitted; only FIG. 6 shows a mounting surface 63, recessed in a wall of the transducer housing 10, for the transition piece 8. An electrical conduit 64 is arranged in the mounting surface 63, by means of which electrical connections for the exciter arrangement 60 and the sensor arrangement 70, as well as possible other electrical components, such as e.g. pressure and/or temperature sensors provided, if needed, in the measurement transducer 1, can be made.

The flow tubes 4, 5 of the measurement transducer, as well as the exciter and sensor arrangements applied in each case thereto, are practically completely encased by the transducer housing 10, as is clear from the presentation provided by FIGS. 3a, b and 5 and as is, in fact, usual for measurement transducers of such type. The transducer housing serves, thus, not only as holder of the flow tubes 4, 5, but also, additionally, for protecting the internal components of the measurement transducer 1, such as, for example, the exciter and sensor arrangements, and, additionally, other components placed therein, from external, environmental influences, such as e.g. dust or water spray. Beyond this, the transducer housing 10 can also additionally be embodied and dimensioned such that, in the case of possible damage to the flow tube 4, e.g. by crack formation or bursting, escaping medium is retained as completely as possible within the transducer housing, up to a required maximum gage pressure. Possible choices of material for the transducer housing, especially also the housing cap 7, can include steels, such as structural steel or stainless steel, or also other suitable high-strength materials. In a further embodiment of the measurement transducer, the flow tube 4, especially an at least sectionally curved one, and the transducer housing are made each of the same material, especially steel or stainless steel, or at least materials which are similar to one another, especially various types of steel. Additionally, it is provided that the flanges are constructed as integral components of the transducer housing, as, in fact, shown in FIGS. 3*a, b* and as is quite common with such measurement transducers, in order to achieve as short an installation length as possible, coupled with as high stability of the measurement transducer as possible; equally, the possibly present distribution pieces 11, 12 can also be integrated directly into the transducer housing.

In the case of the example of an embodiment shown here, the transducer housing 10 includes a support element 6 (here illustrated in the form of a laterally at least partially open, support cylinder), which, as shown in FIGS. 4 to 6, is mechanically connected at the inlet and outlet ends with the at least one flow tube, such that the at least one, curved tube segment 41 extends laterally outwards. Additionally, the transducer housing includes a housing cap 7 arranged spaced from the curved middle tube segments of the flow tubes 4, 5 and fixed to the support element 6, especially permanently and/or sealed against escape of medium. In the case of the example of an embodiment illustrated here, at least the flow tube 4 is held in the, in this instance, tubular support element 6 at the inlet and outlet ends, such that the oscillatable middle tube segment 41, extending through two cutouts 61, 62 of the support element, protrudes laterally out of such and, consequently, into the housing cap 7 likewise fixed on the support element 6. It is to be noted, in this context, that, instead of the essentially tubular support element 6 illustrated here, also a, if need be, solid support cylinder of some other suitable cross section can be used, for example a support element more in the form of a beam.

Depending on which form and stretched length is actually chosen for the flow tubes 4, 5, the here essentially cylindrical support element has a length essentially equal to, or somewhat shorter than, the stretched length of the flow tubes 4, 5. In keeping with this and the above-mentioned dimensions of the essentially identical flow tubes 4, 5, the support element of this embodiment of the measurement transducer has likewise a length of at least about 1000 mm. Preferably, the cylindrical support element is, however, realized with a length of over 1200 mm. Furthermore, the support element has a mass of at least 70 kg, especially in the case that it is made of steel. According to a further embodiment of the measurement transducer, the support element is, however, constructed and dimensioned such that its mass amounts to more than 140 kg. Accordingly, the measurement transducer of the invention is embodied and dimensioned such that a mass ratio of a total mass of an outer oscillation system composed of the transducer housing and the possibly present distributor pieces to a total mass of the inner oscillation system can be, without more, smaller than 3, especially equal to or less than 2.

The housing cap 7 serving for the housing of the tube segments 41 includes, as indicated schematically in FIGS. 3*a, b*, a channel-shaped cap segment 10*c*, together with an essentially planar, first lateral housing segment 10*a* and a second lateral housing segment 10*b* essentially mirror-symmetrical to the first segment 10*a*. The form of the cap segment 10*c* corresponds, as clearly evident from the combination of FIGS. 3*a* and 3*b*, essentially to that of a toroidal shell. Accordingly, the cap segment 10*c* has an essentially circular-arc-shaped, preferably semicircularly shaped, cross section of predeterminable radius r and, at least virtually, an essentially circular-arc-shaped, first segment edge 10*c'* having a radius R significantly larger than the radius r, as well as a second segment edge 10*c"* formed essentially identically to the first segment edge. In case necessary, both the cross section and the segment edge can be formed less than ideally circular, thus slightly elliptically. As clearly evident from the combination of FIGS. 3*a, b* and 4, the lateral housing segments 10*a*,10*b* are each connected with, respectively, the first and second segment edges 10*c'*, 10*c"* of the cap segment 10*c*, via a circular-arc-shaped, first segment edge 10*a'*, respectively 10*b'*, and, indeed, such that the lateral housing segments 10*a*, 10*b* are each arranged essentially aligned in a tangential plane of the cap segment 10*c* and, consequently, toward a tangent which can be constructed on the respective associated segment edges 10*ca* and 10*cb*. Stated differently, in each case between the cap segment 10*c* and the housing segment 10*a*, and between the cap segment 10*c* and the housing-segment 10*b*, there is a largely continuous, thus as smooth as possible, transition, so that, in the case of allowable internal gage pressure, almost no, or only very small, bending stresses are produced. Moreover, the housing cap 7 is fixed via a third segment edge 10*c*$^+$ and a fourth segment edge 10*c*$^\#$ of the cap segment 10*c*, as well as via, in each case, a second segment edge 10*a"*, 10*b"* of the first and second lateral housing segments 10*a*, 10*b*, to the support element 6, and, indeed, such that the cap segment, and, thus, the housing segments 10*c*, 10*a*, 10*b*, remain, during operation, spaced from the at least one, vibrating tube segment 4. For manufacture of the housing cap 7, the segments 10*c*, 10*a*, 10*b* are each prefabricated separately and subsequently joined together, especially welded together. Advantageously, in producing the housing cap 7, for example the method for manufacturing a metal cap usable as housing cap 7 described in the already mentioned WO-A 03/021202 can be used, in which such is formed by the welding of two cap halves of essentially identical form, especially such cut out of a plate-shaped stock, with an edge bead, especially a bead in the form of a quarter torus. Additionally, the housing cap 7 can also be e.g. deep drawn from a metal sheet of appropriate thickness.

In one embodiment of the measurement transducer, the housing cap 7 is dimensioned such that it has a mass of at least 10 kg, especially, however, of more than 20 kg, especially in the case of steel as the material of the housing. Considering that the support element can easily have a mass of 70 kg or more, a transducer housing having a mass of at least 80 kg results, especially, however, of more than 160 kg. However, for the above-mentioned case that flanges and/or distributor pieces are provided in the measurement transducer and these are, thus, also part of the external oscillation system, a correspondingly higher mass is to be estimated for the total mass of the external oscillation system and to be appropriately considered in the tuning of the external oscillation system to the internal oscillation system. At least to this extent, the mass of the total external oscillation system can easily amount to 200 kg or considerably more. Especially in the case of applying flow tubes having an inner diameter of over 100 mm, the mass of the external oscillation system can be far above 300 kg. In the example of an embodiment of the measurement transducer 1 illustrated here, transport hook-in means are provided at the inlet and outlet ends on the support element, as shown schematically in FIGS. 4 and 6, these serving as defined attachment points for possible installation-helping means, such as e.g. appropriate cables or bands of lifting tools, in order better to prevent any damaging of the possibly over 500 kg heavy measurement transducer, for example due to inappropriate transport and/or unsuitable choice of hook-in points. For minimizing disturbance oscillations developed on the part of the external oscillation system, especially on the part of the transducer housing, additional, appropriate support elements can be fixed to the transducer housing, such as are described e.g. in the not-pre-published, German patent application DE 102004053883.2.

For tuning mechanical resonance frequencies of the internal oscillation system, as well as for minimizing mechanical stresses and/or vibrations caused by the vibrating tubes at the inlet or outlet ends in the transducer housing, the two flow tubes 4, 5 are connected mechanically together on the inlet end by means of at least three coupling elements 217a, 217b, 217c, as well as on the outlet end by means of at least three coupling elements 218a, 218b, 218c.

In an embodiment of the invention, the coupling elements 217a, 217b, 217c, especially plate-shaped such elements, on the inlet end, as well as the coupling elements 218a, 218b, 218c, especially plate-shaped such elements, on the outlet end are arranged and fixed on the two flow tubes such that at least those clamping forces produced within the transducer housing by the vibrating flow tubes 4, 5 are minimized, that act predominantly in the direction of that principle axis of inertia H of the measurement transducer, which runs essentially perpendicularly to the oscillation axis and essentially lies in an imaginary middle plane E of the measurement transducer lying between the two, curved middle tube segments 41, 51 of the flow tubes 4, 5, thus in the direction of the vertical axis of the measurement transducer, as already mentioned above. The six coupling elements 217a, 217b, 217c, 218a, 218b, 218c are, in such case, so arranged and oriented that a symmetry of the measurement transducer, existing with reference to the vertical axis H as well as with reference to the mentioned middle plane, is maintained, this effort towards symmetry being evident without more from FIG. 4 and being usual for measurement transducers of the described kind.

It has been found, surprisingly, in such case, that, be it by their dimensioning and/or their positioning on the two flow tubes 4, 5, the wanted oscillation frequency $F_n$ of the internal oscillation system can be still be influenced predominantly by means of the coupling elements 217a, 218a nearest to the halfway point of the flow tubes, while the coupling elements 217c, 218c farthest from the halfway point of the flow tubes can be used to optimize the clamping forces acting predominantly perpendicularly to the vertical axis H (X-direction) and the intermediate of three coupling elements at the inlet end and the intermediate of the three coupling elements at the outlet end—here, thus, the coupling elements 217b, 218b—can be used to optimize clamping forces acting predominantly in the direction of the vertical axis (Y-direction). Thus, for concrete measurement transducers, the optimum positions of the at least six coupling elements 217a, 217b, 217c, 218a, 218b, 218c can be found, once the wanted frequency band $\Delta F_n$ for the internal oscillation system has been given, with very little effort experimentally and/or by means of computer-aided calculations, especially also simulations.

Also as a result of such investigations, a further embodiment of the invention provides that at least a first and second coupling element 217a, 217b of the coupling elements 217a, 217b, 217c connecting the two flow tubes 4, 5 together on the inlet end are each fixed to the intermediate tube segments 43, 53 of the first and second flow tubes 4, 5 on the inlet end.

Equally in the case of this embodiment of the invention, at least a first and second coupling element 218a, 218b of the coupling elements 218a, 218b, 218c connecting the two flow tubes 4, 5 together on the outlet end are each fixed to the intermediate tube segments 45, 55 of the first and second flow tubes 4, 5 on the outlet end. In another embodiment of the invention, additionally, at least a third coupling element 217c of the coupling elements 217a, 217b, 217c connecting the two flow tubes 4, 5 together at the inlet end is fixed to the inlet tube segment 42, 52 of the first and second flow tubes, and at least a third coupling element 218c of the coupling elements 218a, 218b, 218c connecting the two flow tubes 4, 5 together at the inlet end is fixed to the inlet tube segment 44, 54 of the first and second flow tubes 4, 5.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A measurement transducer of vibration-type for measuring a flowable medium, conveyed in a pipeline, said measurement transducer comprising:

a transducer housing, which is mechanically coupled with the pipeline via an inlet end and an outlet end;

at least one first flow tube held in an oscillatable manner in said transducer housing and vibrating at least at times, and a second flow tube mechanically coupled with said at least one first flow tube and likewise vibrating at least at times, each of said first and second flow tubes executing during operation, at lest at times, bending oscillations about an imaginary oscillation axis essentially parallel to a longitudinal axis of the measurement transducer, and at least one of said first and second flow tubes being embodied as a measuring tube communicating with the pipeline and serving to convey the medium to be measured;

each of the two flow tubes including an at least sectionally curved central, middle tube segment, each of the two flow tubes including at its inlet end a straight inlet tube segment extending essentially parallel to the imaginary oscillation axis, each inlet tube segment communicates with the middle tube segment of the respective flow tube via an inlet-end, curved, intermediate tube segment, and each of the two flow tubes including at an outlet end a straight outlet tube segment extending essentially parallel to the imaginary oscillation axis and each outlet tube segment communicates with the middle tube segment of the respective flow tube via an outlet-end, curved, intermediate tube segment;

an electromechanical exciter arrangement acting on at least one of the flow tubes for producing and/or maintaining mechanical oscillations of the at least one flow tube;

a sensor arrangement reacting to movements at least of said at least one first flow tube, for producing at least one oscillation measurement signal representing oscillations of said at least one first flow tube; and at least three coupling elements connecting the first and the second flow tubes together at their inlet ends, as well as at least three coupling elements connecting the first and the second flow tubes together at their outlet ends wherein:

at least one first and at least one second coupling element of said at least three coupling elements, connecting the two flow tubes on the inlet end with one another, are each affixed to the inlet-end, intermediate tube segments of the first and second flow tubes; and at least one first and at least one second coupling element of said at least three coupling elements, connecting the two flow tubes on the outlet end with one another, are each affixed to the outlet-end, intermediate tube segments of the first and second flow tubes, and at least one, third coupling element of the coupling elements connecting the two flow tubes together on the inlet end is fixed to each of the inlet-end tube segments of the first and second flow tubes and wherein at least one, third coupling element of the coupling elements connecting the two flow tubes together on the outlet end is fixed to each of the outlet-end tube segments of the first and second flow tubes.

2. The measurement transducer as claimed in claim 1, wherein:

two flow tubes oscillate during operation essentially with opposite phase.

3. The measurement transducer as claimed in claim 1, wherein:

each of the middle tube segments of the two flow tubes essentially show a V-shape.

4. The measurement transducer as claimed in claim 3, wherein:

each of the two flow tubes shows a mass of at least 10 kg, an inner diameter of at least 80 mm, and a stretched length of at least 1000 mm.

5. The measurement transducer as claimed in claim 4, further comprising:

a first distributor piece connecting the first and second flow tubes together at the inlet end, as well as a second distributor piece, connecting the first and second flow tubes together at the outlet end, wherein:

the second flow tube likewise is constructed as a second measuring tube serving for the conveying of medium to be measured, and each of the two distributor pieces has a mass of more than 10 kg.

6. The measurement transducer as claimed in claim 1, wherein:

the inlet-end coupling elements and the outlet-end coupling elements are so arranged and fixed on the two flow tubes that those clamping forces produced by the vibrating flow tubes within the transducer housing are minimized, which act predominantly in the direction of that principal axis of inertia of the measurement transducer, that runs essentially perpendicularly to the longitudinal axis and that lies essentially in an imaginary central plane of the measurement transducer extending between the two curved middle tube segments of the flow tubes.

7. The measurement transducer as claimed in claim 1, wherein:

each of the middle tube segments of the two flow tubes essentially shows a V-shape and wherein each of the middle tube segments of the two flow tubes has an apex with an included apex angle smaller than 150°.

8. The measurement transducer as claimed in claim 7, wherein:

each of said V-shaped middle tube segments of the two flow tubes comprises an apex with an included apex angle smaller than 120°.

9. The measurement transducer as claimed in claim 1, wherein:

the first flowtube runs essentially parallel to the second flow tube; and/or the first measurement transducer tube is essentially constructed identically to the second measurement transducer tube.

10. The measurement transducer as claimed in claim 1, further comprising:

a first distributor piece connecting the first and second flow tubes together at the inlet end, as well as a second distributor piece connecting the first and second flow tubes together at the outlet end, wherein the second flow tube likewise is constructed as a second measuring tube serving for the conveying of the medium to be measured and for communicating with the pipeline.

11. The measurement transducer as claimed in claim 10, wherein:

each of the two distributor pieces has a mass of more than 10 kg.

12. The measurement transducer as claimed in claim 11, wherein:

an external oscillation system of the measurement transducer is formed by the transducer housing and at least by the distributor pieces, while an internal oscillation system of the measurement transducer is formed by the two flow tubes, the medium at least instantaneously conveyed therein and at least in part by the exciter and sensor arrangements, and wherein the internal oscillation system, driven by the exciter arrangement, executes during operation of the measurement transducer, at least at times, mechanical oscillations having at least one wanted oscillation frequency, which depends both on the size, shape and material of the flow tube and on an instantaneous density of the medium, and which is changeable during operation of the measurement transducer within a predetermined wanted frequency band having lower and upper limit frequencies.

13. The measurement transducer as claimed in claim 12, wherein:

a total mass of the external oscillation system amounts to at least 200 kg.

14. The measurement transducer as claimed in claim 13, wherein:

a mass ratio of a total mass of the external oscillation system to a total mass of the internal oscillation system is, during operation, at least at times, smaller than 3.

15. The measurement transducer as claimed in claim 14, wherein:

the mass ratio of said total mass of the external oscillation system to said total mass of the internal oscillation system is, during operation, at least at times, smaller than 2.5.

16. The measurement transducer as claimed in claim 13, wherein:
a mass ratio of the total mass of the external oscillation system to the total mass of the internal oscillation system is continuously smaller than 3.

17. The measurement transducer as claimed in claim 12, wherein:
the internal oscillation system, driven by the exciter arrangement, executes during operation of the measurement transducer, at least at times, mechanical oscillations in the form of lateral oscillations.

18. The measurement transducer as claimed in claim 1, wherein:
the transducer housing includes a support element, with which the at least one flow tube is mechanically connected at its inlet and outlet ends.

19. The measurement transducer as claimed in claim 18, wherein:
the support element of said transducer housing is made of steel.

20. The measurement transducer as claimed in claim 1, wherein:
the support element is constructed in the form of a support cylinder which is at least partially laterally open and connected with the at least one flow tube such that the at least one, curved tube segment protrudes laterally out of the support cylinder.

21. The measurement transducer as claimed in claim 1, wherein:
the support element has a mass of at least 70 kg, and/or a length of at least 1000 mm.

22. The measurement transducer as claimed in claim 21, wherein:
the support element has a mass of more than 140 kg, and/or a length of more than 1200 mm.

23. The measurement transducer as claimed in claim 1, wherein:
each of the flow tubes and the transducer housing, is made, at least in part, of steel.

24. The measurement transducer as claimed in claim 1, wherein:
each of the flow tubes shows at least one of the following technical features:
a mass of at least 10 kg;
an inner diameter of at least 80 mm;
a cross section whose area moment of inertia is greater than $2 \times 10^4$ mm$^3$;
a cross section whose section modulus resisting bending is greater than $10^6$ mm$^4$; and
a stretched length of at least 1000 mm.

25. The measurement transducer as claimed in claim 24, wherein:
each of the flow tubes shows at least one of the following technical features: a mass of greater than 25 kg, a cross section whose section modulus resisting bending is greater than $2 \times 10^6$ mm, and a stretched length greater than 1500 mm.

26. The measurement transducer as claimed in claim 1, wherein:
an internal oscillation system of the measurement transducer is formed by the two flow tubes, the medium at least instantaneously conveyed therein, and at least in part by the exciter and sensor arrangements, and wherein the internal oscillation system, driven by the exciter arrangement, executes during operation of the measurement transducer, at least at times, mechanical oscillations with at least one wanted oscillation frequency, which depends both on the size, shape and material of the flow tube and on an instantaneous density of the medium, and which is changeable during operation of the measurement transducer, within a predetermined wanted frequency band having upper and lower limit frequencies.

27. The measurement transducer as claimed in claim 26, wherein:
a total mass of the internal oscillation system amounts to at least 70 kg.

28. The measurement transducer as claimed in claim 27, wherein:
the total mass of the internal oscillation system amounts during operation, at least at times, to more than 90 kg.

29. The measurement transducer as claimed in claim 1, wherein:
an installed mass of the total measurement transducer is greater than 200 kg.

30. The measurement transducer as claimed in claim 29, wherein:
the installed mass of the total measurement transducer is greater than 400 kg.

31. The use of the measurement transducer as claimed in claim 1 for measuring a flowable medium conveyed in a pipeline having a caliber greater than 150 mm and/or for measuring a mass flowrate of a medium flowing through a pipeline with a rate which is, at least at times, greater than 900 t/h.

32. The measurement transducer as claimed in claim 1, wherein:
the electromechanical exciter arrangement being embodied as an electrodynamic exciter arrangement.

33. The measurement transducer as claimed in claim 1, wherein:
the sensor arrangement reacting to bending oscillations at least of said at least one first flow tube for producing said at least one oscillation measurement signal representing oscillations of said at least one first flow tube.

34. The measurement transducer as claimed in claim 1, wherein:
each of the two distributor pieces has a mass of more than 20 kg.

35. The measurement transducer as claimed in claim 1, wherein:
a total mass of the external oscillation system amounts more than 300 kg.

36. The measurement transducer as claimed in claim 1, wherein:
the support element is constructed in the form of a tubular support cylinder, which is at least partially laterally open and connected with the at least one flow tube such that the at least one, curved tube segment protrudes laterally out of the support cylinder.

37. The measurement transducer as claimed in claim 1, wherein:
each of the flow tubes and the transducer housing, is made, at least in part, of stainless steel.

38. The measurement transducer as claimed in claim 1, wherein:
an internal oscillation system of the measurement transducer is formed by the two flow tubes, the medium at least instantaneously conveyed therein, and at least in part by the exciter and sensor arrangements, and wherein: the internal oscillation system, driven by the exciter arrangement, executes during operation of the measurement transducer, at least at times, mechanical oscillations in the form of lateral oscillations, with at least one wanted oscillation frequency, which depends both on the size, shape and material of the flow tube and on an instantaneous density of the medium, and which is changeable during operation of the measurement transducer, within a predetermined wanted frequency band having upper and lower limit frequencies.

39. The use of the measurement transducer as claimed in claim 1 for measuring a flowable medium conveyed in a pipeline having a caliber greater than 250 mm and/or for measuring a mass flowrate of a medium flowing through a pipeline with a rate which is, at least at times, greater than 1200 t/h.

40. The use of the measurement transducer as claimed in claim 1 for measuring a flowable substance conveyed in a pipeline.

41. The use of the measurement transducer as claimed in claim 1 for measuring a gas, a liquid, or a powder conveyed in a pipeline.

* * * * *